United States Patent
Liu et al.

(10) Patent No.: US 11,477,505 B2
(45) Date of Patent: *Oct. 18, 2022

(54) METHOD AND APPARATUS FOR MANAGING OVER-THE-TOP VIDEO RATE

(71) Applicant: AT&T Intellectual Property I, L.P., Atlanta, GA (US)

(72) Inventors: Zhengye Liu, Pleasanton, CA (US); Jin Wang, Fremont, CA (US); Yali Liu, Dublin, CA (US); Yongdong Zhao, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/463,586

(22) Filed: Sep. 1, 2021

(65) Prior Publication Data

US 2021/0400327 A1  Dec. 23, 2021

Related U.S. Application Data

(63) Continuation of application No. 17/037,250, filed on Sep. 29, 2020, now Pat. No. 11,140,430, which is a
(Continued)

(51) Int. Cl.

| H04N 21/2662 | (2011.01) |
|---|---|
| H04L 47/193 | (2022.01) |
| H04N 21/24 | (2011.01) |
| H04N 21/61 | (2011.01) |
| H04N 21/442 | (2011.01) |
| H04N 21/44 | (2011.01) |

(Continued)

(52) U.S. Cl.
CPC ....... *H04N 21/2662* (2013.01); *H04L 47/193* (2013.01); *H04N 21/2402* (2013.01); *H04N 21/4363* (2013.01); *H04N 21/44004* (2013.01); *H04N 21/44209* (2013.01); *H04N 21/6125* (2013.01); *H04N 21/64322* (2013.01); *H04L 5/006* (2013.01); *H04L 43/062* (2013.01); *H04L 43/0876* (2013.01); *H04L 43/0888* (2013.01); *H04L 43/12* (2013.01)

(58) Field of Classification Search
None
See application file for complete search history.

(56) References Cited

U.S. PATENT DOCUMENTS

| 9,225,762 B2 | 12/2015 | Vince et al. |
|---|---|---|
| 9,325,468 B2 | 4/2016 | Mitola |

(Continued)

OTHER PUBLICATIONS

Qadir, Muhammad , "Mechanisms for QoE optimisation of Video Traffic: A review paper", Australasian Journal of Information, Communication Technology and Applications, vol. 1, Issue 1, 2015, 1-18.

*Primary Examiner* — James R Marandi
(74) *Attorney, Agent, or Firm* — Guntin & Gust, PLC; Mark Wilinski

(57) ABSTRACT

Aspects of the subject disclosure may include, for example, a device including a processing system including a processor and a memory that stores executable instructions that, when executed by the processing system, facilitate performance of operations, including monitoring network traffic to determine a transmission control protocol traffic pattern, determining a target video rate from the transmission control protocol traffic pattern, and modifying an over-the-top video delivery service network according to the target video rate. Other embodiments are disclosed.

20 Claims, 8 Drawing Sheets

Related U.S. Application Data continuation of application No. 15/289,408, filed on Oct. 10, 2016, now Pat. No. 10,827,211.

(51) Int. Cl.

| | |
|---|---|
| *H04N 21/4363* | (2011.01) |
| *H04N 21/643* | (2011.01) |
| *H04L 43/12* | (2022.01) |
| *H04L 43/0888* | (2022.01) |
| *H04L 43/0876* | (2022.01) |
| *H04L 43/062* | (2022.01) |
| *H04L 5/00* | (2006.01) |

(56) References Cited

U.S. PATENT DOCUMENTS

| | | |
|---|---|---|
| 9,386,597 B2 | 7/2016 | Westberg et al. |
| 9,414,248 B2 | 8/2016 | Kovvali et al. |
| 9,420,317 B2 | 8/2016 | McCarthy |
| 9,438,935 B2 | 9/2016 | McDysan et al. |
| 9,445,138 B2 | 9/2016 | Walker et al. |
| 2003/0086514 A1 | 5/2003 | Ginis et al. |
| 2006/0256130 A1 | 11/2006 | Gonzalez |
| 2015/0026749 A1 | 1/2015 | Bringuier et al. |
| 2015/0029925 A1 | 1/2015 | Mantin |
| 2015/0046568 A1 | 2/2015 | Mantin |
| 2015/0264299 A1 | 9/2015 | Leech |
| 2015/0326898 A1 | 11/2015 | Yang et al. |
| 2015/0358919 A1 | 12/2015 | Chen et al. |
| 2016/0028617 A1 | 1/2016 | Subramanian et al. |
| 2016/0113002 A1 | 4/2016 | Frank et al. |
| 2017/0054648 A1 | 2/2017 | Ngo-Tan et al. |
| 2017/0332282 A1 | 11/2017 | Dao |
| 2018/0054377 A1 | 2/2018 | Polychronis |
| 2018/0103283 A1 | 4/2018 | Liu et al. |
| 2021/0014551 A1 | 1/2021 | Liu et al. |

300

200

400

520

540

510

530

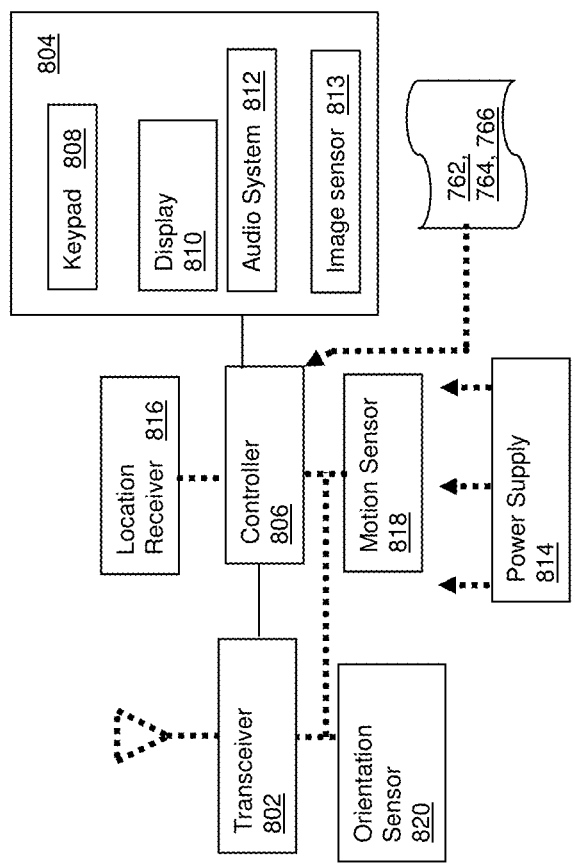

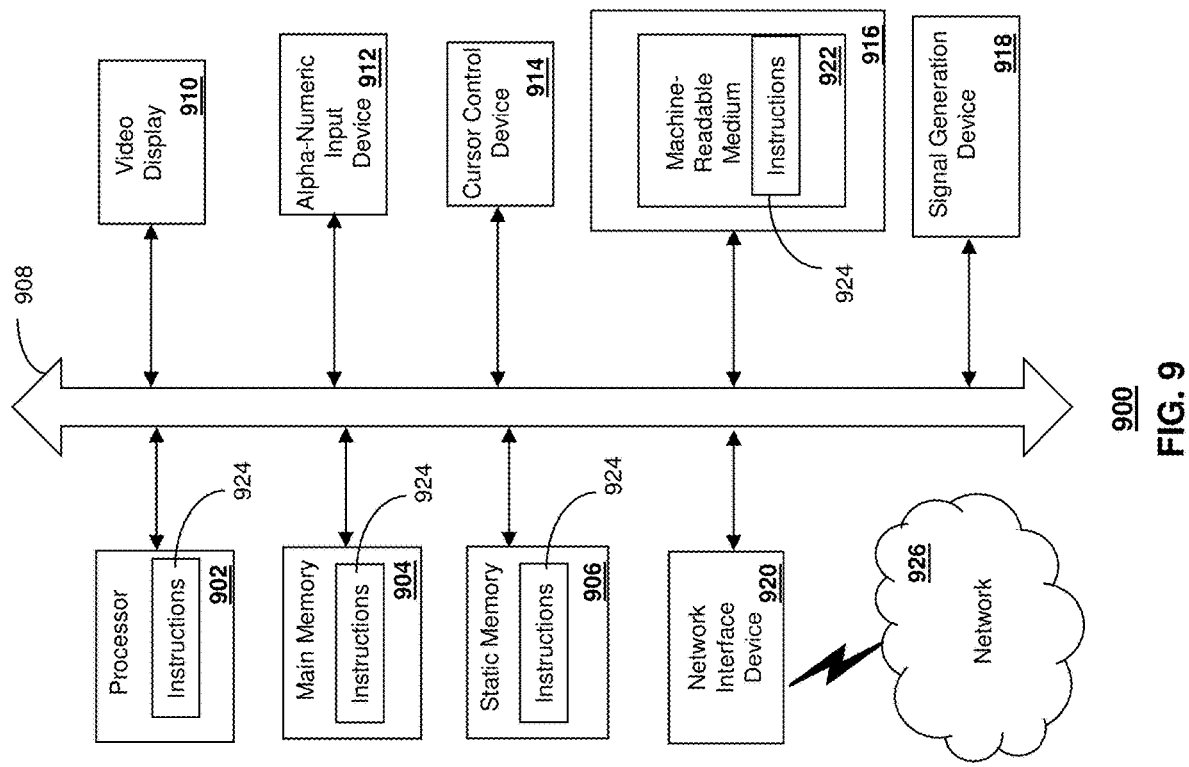

METHOD AND APPARATUS FOR MANAGING OVER-THE-TOP VIDEO RATE

CROSS REFERENCE TO RELATED APPLICATIONS

This application is a continuation of U.S. patent application Ser. No. 17/037,250, filed Sep. 29, 2020, which is a continuation of U.S. patent application Ser. No. 15/289,408, filed Oct. 10, 2016 (now U.S. Pat. No. 10,827,211). All sections of the aforementioned application(s) and patent(s) are incorporated herein by reference in their entirety.

FIELD OF THE DISCLOSURE

The subject disclosure relates to a method and apparatus for managing Over-The-Top Video Rate.

BACKGROUND

Over-The-Top (OTT) services dominate Internet traffic. OTT video services and Internet service providers often seek to estimate video rates. Video rates can be the rates that videos are encoded into, from network traffics, including how video bits are transmitted over the networks.

BRIEF DESCRIPTION OF THE DRAWINGS

Reference will now be made to the accompanying drawings, which are not necessarily drawn to scale, and wherein:

FIG. 8 depicts an illustrative embodiment of a communication device; and

FIG. 9 is a diagrammatic representation of a machine in the form of a computer system within which a set of instructions, when executed, may cause the machine to perform any one or more of the methods described herein.

DETAILED DESCRIPTION

The subject disclosure describes, among other things, illustrative embodiments for estimating video rates. Other embodiments are described in the subject disclosure.

One or more aspects of the subject disclosure include a device including a processing system including a processor and a memory that stores executable instructions that, when executed by the processing system, facilitate performance of operations, including monitoring network traffic to determine transmission control protocol traffic pattern, determining a target video rate from the transmission control protocol traffic pattern, and modifying an over-the-top video delivery service network according to the target video rate.

One or more aspects of the subject disclosure include a method including monitoring, by a processing system comprising a processor, network traffic to determine transmission control protocol traffic pattern, determining, by the processing system, an optimized video rate from the transmission control protocol traffic pattern, determining, by the processing system, a quality of video service of an over-the-top video delivery service network using the network traffic, and improving the quality of video service of the over-the-top video delivery service network according to the optimized video rate.

One or more aspects of the subject disclosure include a machine-readable storage medium, including executable instructions that, when executed by a processing system including a processor, facilitate performance of operations that include monitoring network traffic to determine transmission control protocol traffic pattern, determining a target video rate from the transmission control protocol traffic pattern, and modifying an over-the-top video delivery service network according to the target video rate.

The evolution of IP networks and access-agnostic access paved the way for Over-The-Top (OTT) services to flourish. OTT video services now dominate Internet traffic. To improve subscriber quality of experience and generating new revenue streams, it is preferable to efficiently measure and monitor video quality from network traffic. Video rate is one of the most important parameters to indicate video quality and user experience. OTT video services need to accurately estimate video rates. Video rates are the rates that videos are encoded into, from network traffics, including how video bits are transmitted over the networks. This can be done without knowing the OTT's service's video coding configurations.

Embodiments of the present invention provide a system that can evaluate the performance of OTT video applications and provide an assessment of the end user experience impact. Exemplarily, embodiments of the present invention provide a simple and cost-effective solution to estimate slow-varying video playback bit rate from highly dynamic, fast varying TCP traffic counters for general OTT video applications.

Figure 1:
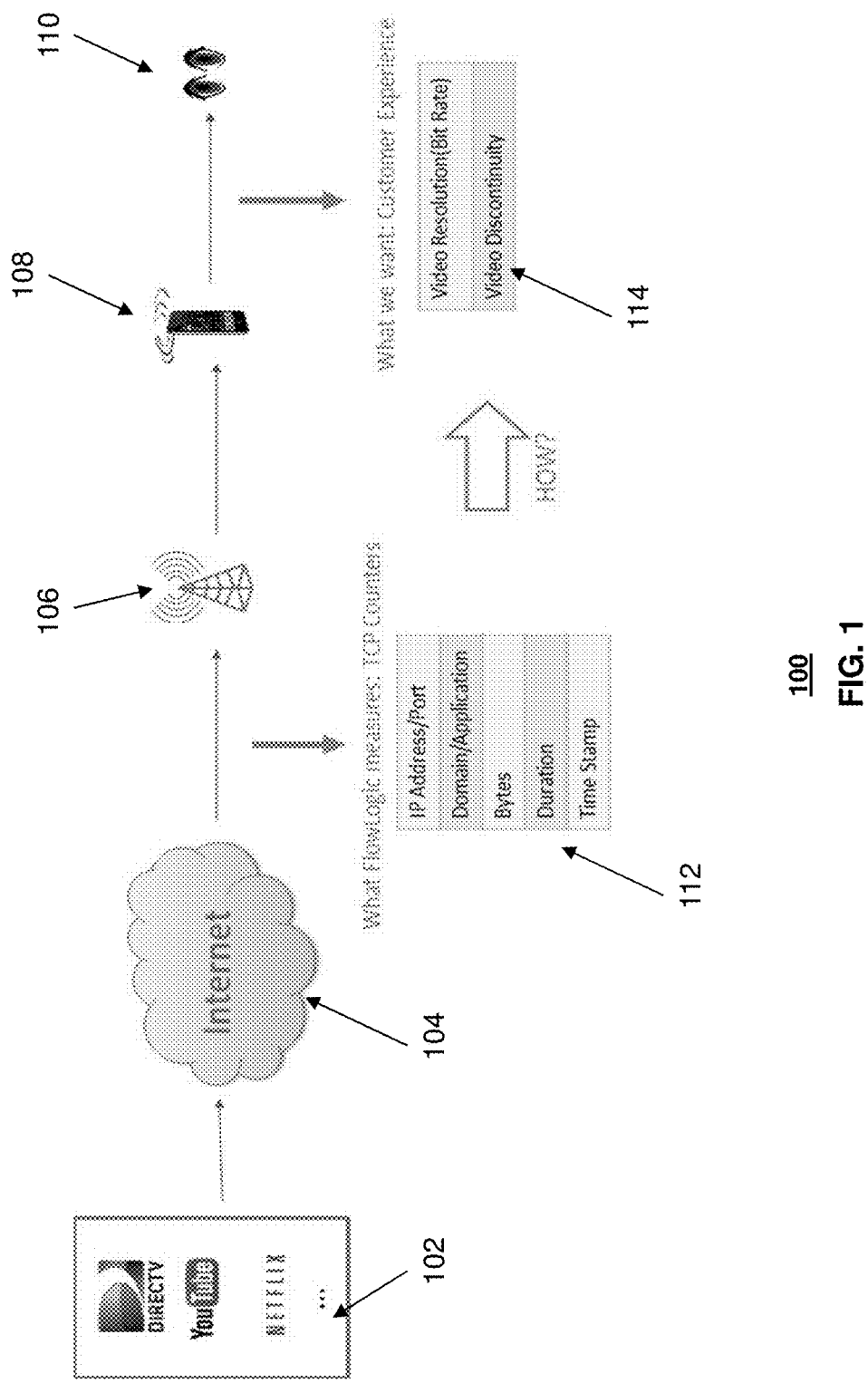
FIG. 1 depicts an illustrative embodiment of system 100.

FIG. 1 illustrates an exemplary OTT video service system 100. Different OTT video applications 102 may adopt different video transmission schemes and protocols with very different configurations. OTT video applications 102 can include different OTT video service providers that provide video services over the Internet 104. In some instances, an OTT application can use single server design vs. multiple server design, single TCP flows vs. multiple TCP flows, different video chunk sizes, different video coding schemes, HTTPS or HTTP, and many more affecting parameters.

As exemplarily illustrated in FIG. 1, the OTT video service can be provided to a user 110 through a mobile communications device 108 that receives the video stream via a mobile communications service provider 106 that is connected to the Internet 104. In other embodiments, users can receive the OTT video service directly through computers or communication devices directly from the Internet 104. Various OTT video designs present various network traffic patterns. Exemplarily, embodiments of the present invention can provide a generic approach that is able to estimate video rates that are streamed from all/most OTT video transmission designs. Exemplarily, embodiments of the present invention can provide a model that is able to capture fundamental behaviors of OTT video systems across the many available various designs.

Conventional schemes mainly rely on the side information which may contains the video rate information, i.e., the full domain URLs or a manifest file. However, the conventional approach is not applied for the encrypted video which are becoming more and more popular in OTT video applications. Other conventional approaches are based on complex mathematical models with an input from video encoding and application implementation parameters.

The exemplary OTT video service system 100 of FIG. 1 also exemplarily includes a network monitor 112 according to various embodiments of the present invention. Exemplarily, in the network monitor 112, a mathematic model, which is able to capture buffer management behavior is applied to the exemplary OTT video service system 100 to determine the fundamental behaviors of OTT video systems.

For internet service providers (ISP's), network probes/monitors are conventionally used to monitor network performance. Such probes typically capture network packets, and perform an analysis on the traffic. After the analysis is performed, a TCP throughput is available. In some embodiments, headers are analyzed without a payload analysis. In other embodiments, customers may be given the option to "opt-in" or "opt-out" of this analysis. Exemplarily, various types of analysis of packets can be used to determine patterns and traffic. Exemplarily, this TCP throughput can be the input of the algorithm used in FIGS. 2 and 3. Exemplarily, the analysis process can identify which Internet traffic is from a particular OTT video service.

In one example, buffer behavior is a fundamental behavior of an OTT video system design. Exemplarily, provided a traffic pattern, containing the transmitted bytes from network in time series, an optimization problem that allocates these bytes optimally to video bytes, to maximize received video quality, is solved. The video bytes obtained based on exemplary embodiments can construct the video rate. Exemplarily, a water-filling algorithm solves the optimization problem. Exemplarily, computation efficiency is taken into account in the water-filling algorithm to handle a huge amount of data.

As illustrated in FIG. 1, an end result is an optimization of a customer user experience 114. The customer user experience 114 can include minimizing of video discontinuities and a maximization of video resolution. By estimating the video rate, the at the network monitor 112, the customer experience 114 can exemplarily be remotely monitored and improved.

Exemplary, the processes mimic the buffer behavior of a typical OTT video system application. In general, no matter how conventional OTT video transmission schemes are designed, (and accordingly traffic patterns are presented), transmitted bytes in network will be sent through a buffer to smooth out network dynamics and reconstruct the original video encoding rate.

Exemplary embodiments of the mathematical model can convert the problem of estimating video rate from network traffic pattern to an optimization problem, provided a network traffic pattern, to exemplarily determine what the best available video rate. The estimated video rate can be considered as a performance upper bound, given a network traffic pattern. Exemplarily, for existing OTT video systems, the transmitted bytes are largely used in an optimized way.

Exemplarily, the optimization problem of estimating video rate from the network traffic pattern is described as follows (see, also, FIGS. 2 and 3 and the associated text below):

$$\max \sum_{i=1}^{N+B} \log(v_i)$$

-continued $$b_i = b_{i,i} + b_{i,i+1} + \ldots + b_{i,i+B-1}, \text{ where } i \text{ is from } 1 \text{ to } N$$

$$v_i = b_{i-B+1,i} + b_{i-B+2,i} + \ldots + b_{i,i}, \text{ where } i \text{ is from } 1 \text{ to } N$$

where bi represents bytes of the network traffic pattern, and vi represents the estimated video rate.

Figure 2:
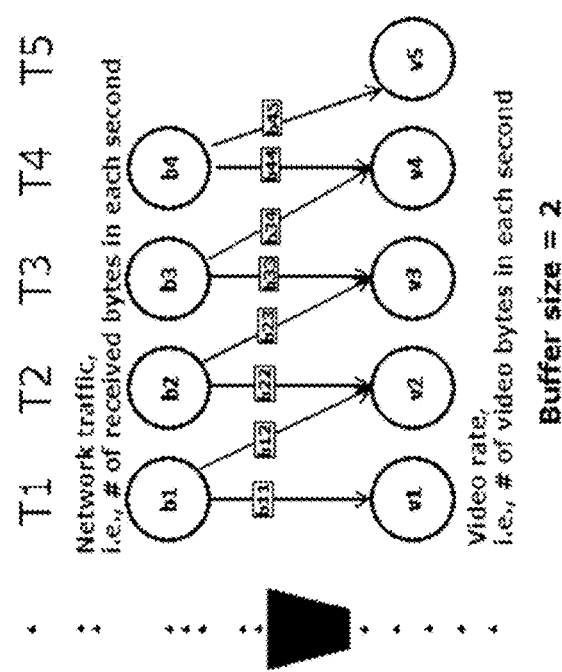
FIG. 2 depicts an illustrative embodiment of method 200 used in portions of the system described in FIG. 1.

FIG. 2 illustrates an exemplary formulation of the optimization problem. In this example, b1, b2, b3, and b4 represents numbers of received bytes in times T1, T2, T3, and T4. In FIG. 2, the buffer size is assumed to be approximately 2 seconds. The optimization problem is to allocate b1, b2, b3, b4 to v1, v2, v3, v4, v5. FIG. 2 illustrates a process that may occur in monitor 112 of FIG. 1.

Figure 3:
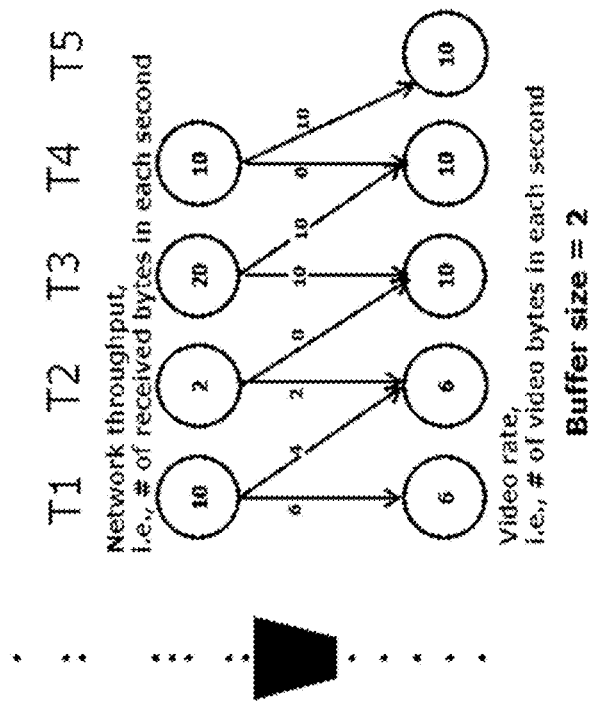
FIG. 3 depicts an illustrative embodiment of a method used in portions of the system described in FIG. 1.

FIG. 3 illustrates another exemplary formulation of the optimization problem. In particular, FIG. 3 illustrates the optimal solution and the estimated video rates for a given setup. Thus, for example, if 10 bytes, 2 bytes, 20 bytes, 10 bytes are transmitted in time slot 1, 2, 3, 4, the estimated video rate will be 6 bytes, 6 byte, 10 bytes, 10 bytes, and 10 bytes, accordingly. FIG. 3 illustrates a process that may occur in monitor 112 of FIG. 1. As discussed above, when the TCP throughput of video traffic is available, exemplary applications of the algorithm, as illustrated in FIG. 3, for example, can take the TCP throughput as an input, and output the estimated video rate.

Figure 4:
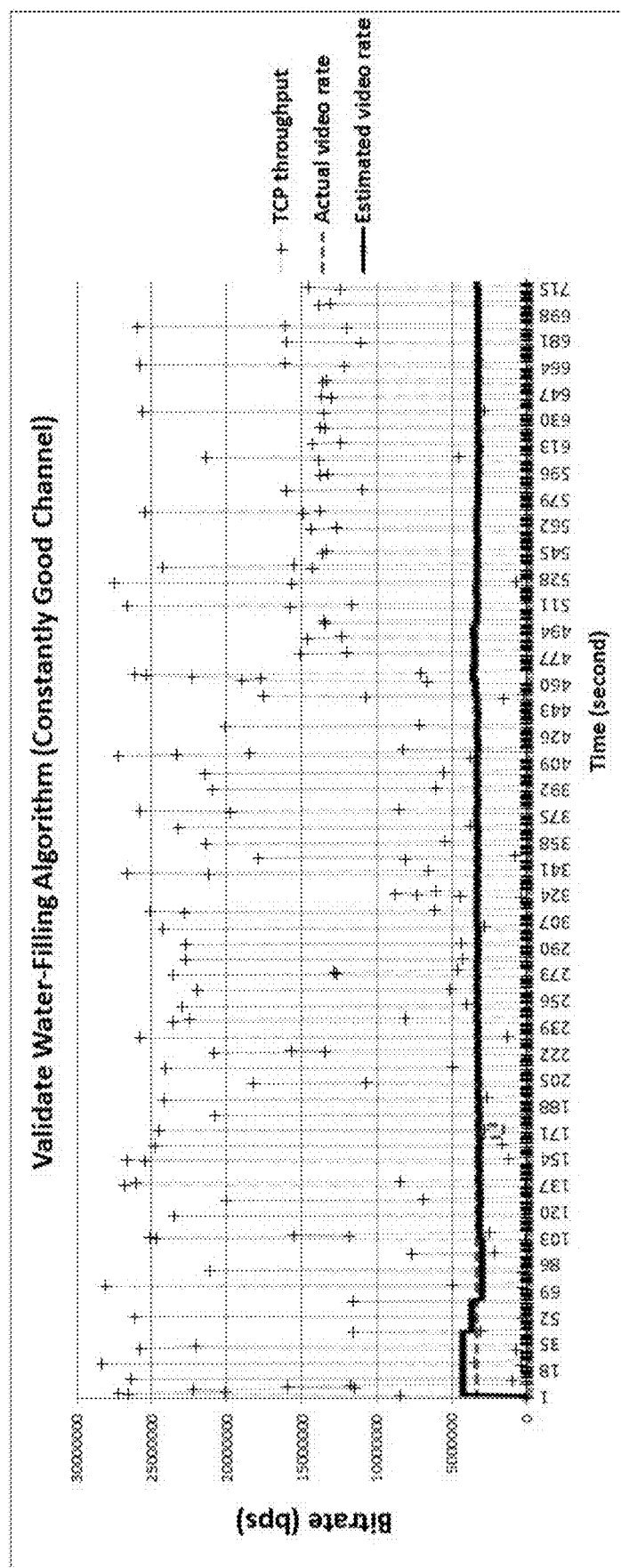
FIG. 4 depicts an illustrative example of estimating video rates.
Figure 5B:
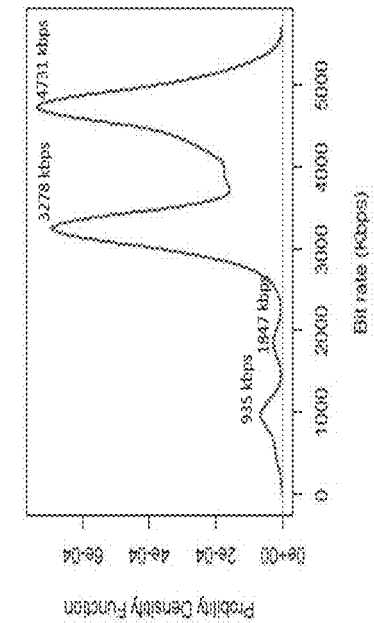
FIGS. 5A, 5B, 5C, and 5D depicts illustrative examples of estimating video rates for various OTT service providers.
Figure 5D:
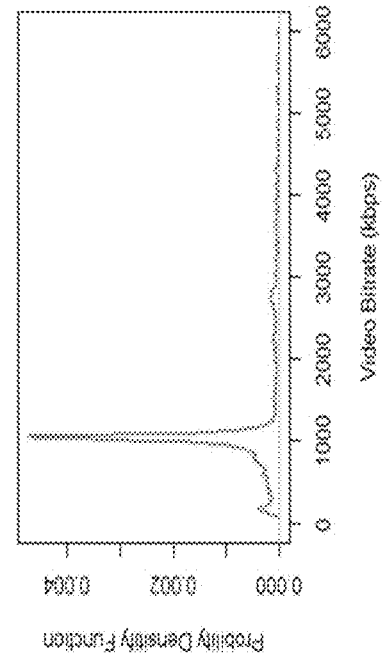
Figure 5A:
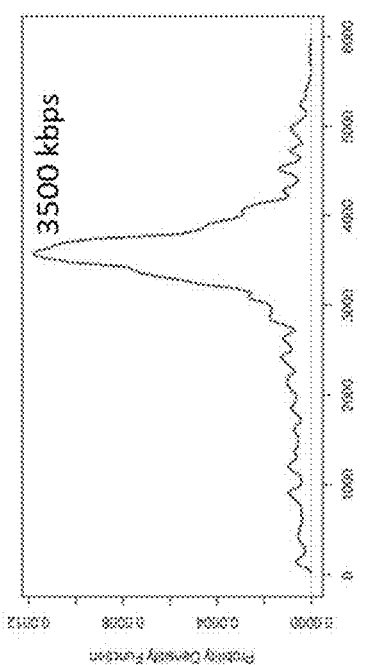
Figure 5C:
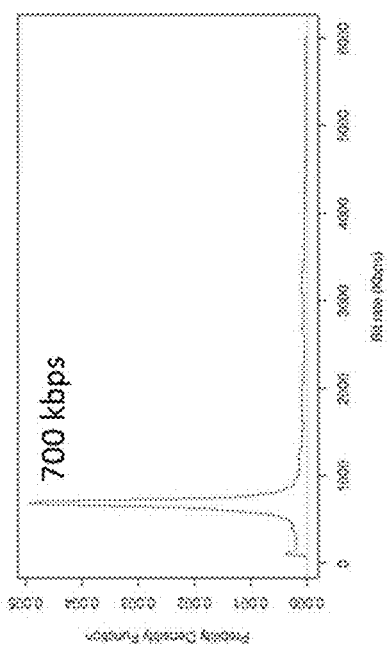

FIG. 4 provides an illustration of an example in which a video rate is estimated from real network traffic. In FIG. 4, the "+" points represent the network traffic pattern, i.e., bitrate of received traffic in each individual second, which is very dynamic. In particular, the network traffic pattern can be referred to as a "TCP throughput" curve. The "TCP throughput" curve is exemplarily what is observed by a network monitor 112 of FIG. 1. The "TCP throughput" curve tends to be very dynamic. The "actual video rate" curve is the video coding rate by content provider, such as the OTT video service 102 of FIG. 1. Generally, these two curves can be quite different. The "estimated video rate" is the output of the exemplary algorithm, where the input is "TCP throughput".

Exemplarily, through testing, the "estimated video rate" and "actual video rate" are largely identical, illustrating that exemplary embodiments of the estimation algorithm tend works in estimating the video rate. In addition, in FIG. 4, the dashed line exemplarily represents the actual video rate, and the solid exemplarily represents the estimated video rate. The solid and dashed lines match with each other very well, which illustrates the accuracy of exemplary embodiments of the estimator.

FIGS. 5A, 5B, 5C, and 5D illustrates examples in which OTT video application's video rates 510, 520, 530, and 540 are estimated from network traffic for various OTT services. FIGS. 5A, 5B, 5C, and 5D clearly show that exemplary embodiments of the present invention can efficiently and accurately measure video quality in terms of video bitrate. Exemplarily, each of FIGS. 5A, 5B, 5C, and 5D represent a different OTT video delivery service.

Exemplary embodiments of the invention can be used to accurately estimate OTT video playback rate from highly-dynamic HTTP streaming throughput. The embodiments allow the characterization of the performance of OTT video in a network and provides opportunities to monitor, track and optimize OTT video quality, as well as quickly troubleshoot any degradation of the OTT video quality.

Exemplary embodiments can provide various services including performance monitoring to determine how different OTT video applications provide different user experience (for individual users, network planning to determine if a service provider is to launch an OTT video service and/or change OTT video configurations and how to plan network accordingly. Exemplarily, this analysis can provide critical guidance for Internet service providers to answer questions that, between OTT video service providers, who provides a better user experience. In other embodiments, the Internet service providers network planning team can answer the question that if one OTT video service providers double its customer base, how to prepare and plan the network accordingly.

Figure 6:
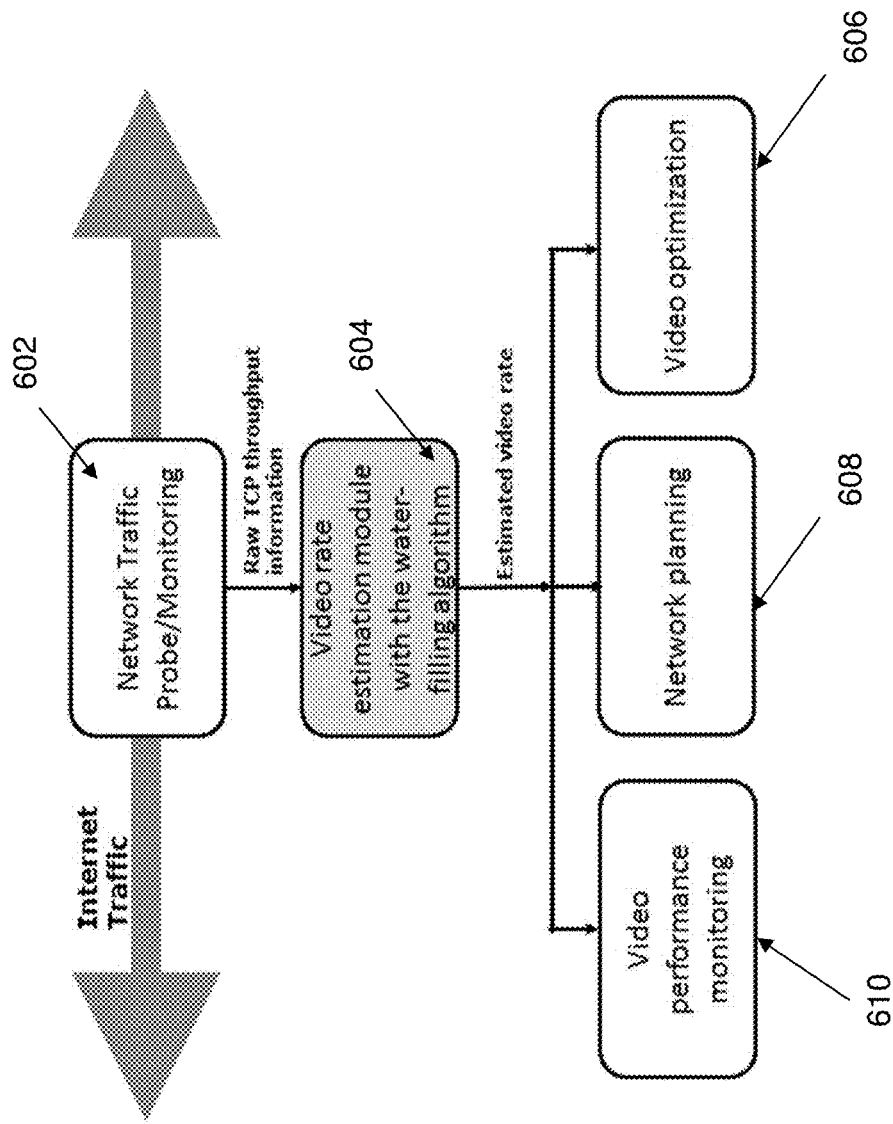
FIG. 6 depicts an illustrative embodiment of a method used in portions of the system described in FIG. 1.

FIG. 6 depicts an illustrative embodiment of a method used by system 100 of FIG. 1. In Step 602, network traffic for an OTT video delivery service is exemplarily monitored or probed. Exemplarily, information such as raw TCP throughout information is obtained. Next, in Step 604, the video rate is estimated with exemplary embodiments of a water-filling algorithm. For example, water-filling algorithms 200 and 300 of FIGS. 2 and 3, respectively, can be employed. Exemplarily, the video rates for the OTT video service can be determined as similarly illustrated in any one of FIGS. 5A, 5B, 5C, and 5D OTT video application's video rates 510, 520, 530, and 540 are determined.

Exemplarily, once the video rates are estimated, the estimated video rates can be utilized adjust the network traffic pattern to provide an optimized or target video rate. In some instances, the estimated video rate may show a poor video viewing experience. In some embodiments, additional bandwidth may be required to ensure that the video rates provide adequate, target, or optimal video rates.

For example, in one instance, video performance monitoring in Step 610. In another embodiment, the estimated video rate can be used in planning the growth of the network in Step 608. As video traffic has and continues to be a large portion of Internet traffic. ISP can plan its network better with a better understanding on video performance. In yet another embodiment, the estimated video rate can be the basis through which the video optimization of the OTT video stream is performed in Step 606. In general, as a video rate is the most important parameter that indicates the quality of video service. With video performance monitoring, an ISP can have a better understanding how its network can serve video applications. Exemplarily, provided that video quality can be monitored, an ISP can design and optimize its network to better support OTT video services.

In additional embodiments, the determination may be subject to a determination to override (or otherwise adjust) the need or desire to meet the target video rate or the optimal video rate. In some instance, the end user device may not be capable of providing an optimal video display if the optimal video rate were achieved. In other embodiments, the target user device or devices may not have a sufficient subscription level to justify enhancing traffic to optimize their respective video rates. In other embodiments, the network may not be capable of increasing bandwidth without undue cost or other technical barriers. Accordingly, in some instances, any one of steps 606, 608, and 610 can be overridden if network conditions or the user devices dictate away from efforts to increase the video rate. In other embodiments, an optimal video rate can be determined but a different video rate (e.g., increased but less than optimal) may be utilized, such as where other factors are considered (e.g., end user device capabilities, subscriber agreements, predicted network traffic, and so forth).

While for purposes of simplicity of explanation, respective processes are shown and described as a series of blocks in FIG. 6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 7:
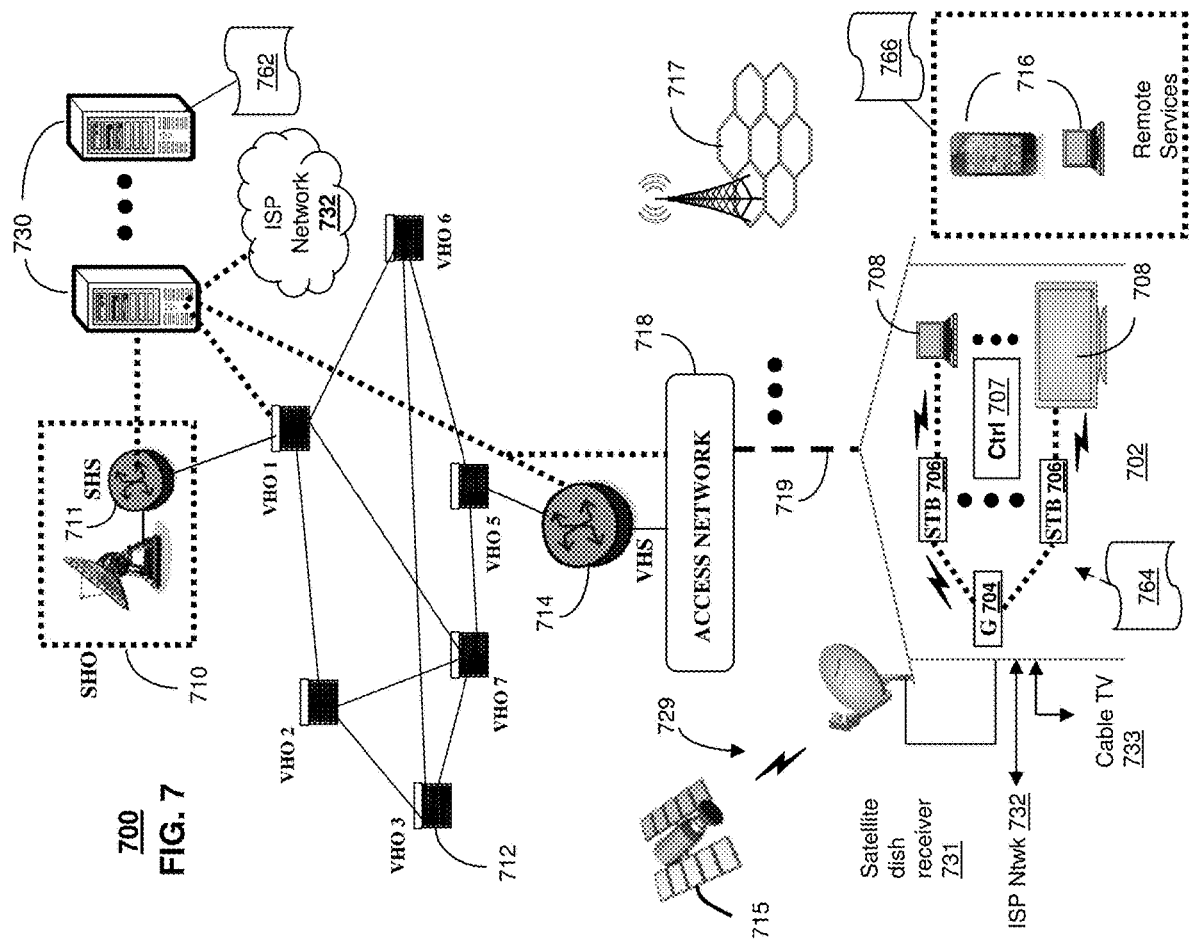
FIG. 7 depicts an illustrative embodiment of a communication system that provide media services used in portions of the system described in FIG. 1.

FIG. 7 depicts an illustrative embodiment of a communication system 700 for providing various communication services, such as delivering media content. The communication system 700 can represent an interactive media network, such as an interactive television system (e.g., an Internet Protocol Television (IPTV) media system). Communication system 700 can be overlaid or operably coupled with OTT video service 100 of FIG. 1 as another representative embodiment of communication system 700. For instance, one or more devices illustrated in the communication system 700 of FIG. 7 can perform a method including monitoring, by a processing system comprising a processor, network traffic to determine transmission control protocol traffic pattern, determining, by the processing system, an optimized video rate from the transmission control protocol traffic pattern, determining, by the processing system, a quality of video service of an over-the-top video delivery service network using the network traffic, and improving the quality of video service of the over-the-top video delivery service network according to the optimized video rate.

In one or more embodiments, the communication system 700 can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol. The VHS 714 can distribute multimedia broadcast content via an access network 718 to commercial and/or residential buildings 702 housing a gateway 704 (such as a residential or commercial gateway).

The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as an OTT video service video rate estimator (herein referred to as estimator 730). The estimator 730 can use computing and communication technology to perform an estimation of an OTT video service video rate 762, which can include among other things, video optimization of Step 606 in FIG. 6 and the network monitor 112 of FIG. 1. For instance, the estimation of an OTT video service video rate 762 of estimator 730 can be similar to the functions described in accordance with method 600 in FIG. 6. The media processors 706 and wireless communication devices 716 can be provisioned with software functions 764 and 766, respectively, to utilize the services of estimator 730. For instance, functions 764 and 766 of media processors 706 and wireless communication devices 716 can be similar to the functions described for the OTT video service system 100 in FIG. 1 in accordance with method 600 of FIG. 6.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 8 depicts an illustrative embodiment of a communication device 800. Communication device 800 can serve in whole or in part as an illustrative embodiment of the devices depicted in FIG. 1 and FIG. 7 and can also be configured to perform portions of method 600 of FIG. 6.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of communications device 108 of FIG. 1, the media processor 706, the media devices 708, or the portable communication devices 716 of FIG. 7. It will be appreciated that the communication device 700 can also represent other devices that can operate in OTT video system 100 of FIG. 1 and communication system 700 of FIG. 7 such as a gaming console and a media player. In addition, the controller 706 can be adapted in various embodiments to perform the functions 762, 764, 766.

Upon reviewing the aforementioned embodiments, it would be evident to an artisan with ordinary skill in the art that said embodiments can be modified, reduced, or enhanced without departing from the scope of the claims described below. For example, other sources of Internet traffic can be measured. In additional embodiments, other forms of Internet service quality or data rates can be estimated and then optimized. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

FIG. 9 depicts an exemplary diagrammatic representation of a machine in the form of a computer system 900 within which a set of instructions, when executed, may cause the machine to perform any one or more of the methods described above. For example, one or more instances of the machine can operate, for example, as the estimator 730, the media processor 706, communications device 108, as well as the delivery systems for providing and optimizing the OTT video services and other devices of FIGS. 1-5. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data (e.g., packet traffic) can be subject to authorization from user(s) associated with the data, such as an opt-in, an opt-out, acknowledgement requirements, notifications, selective authorization based on types of data, and so forth. In one or more embodiments, analysis of traffic can be performed in limited ways, such as based on analysis of particular headers (e.g., without analyzing payloads). Other analysis can be performed via sampling, which may or may not be limited to headers.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
a processing system including a processor; and
a memory that stores executable instructions that, when executed by the processing system, facilitate performance of operations, the operations comprising:
determining a first target video rate from a traffic pattern, wherein the traffic pattern is determined based upon monitoring network traffic, wherein the network traffic includes a first video stream utilizing a first video transmission scheme, wherein the network traffic includes a second video stream utilizing a second, different, video transmission scheme, wherein the first video transmission scheme includes a first video chunk size, a first video coding, and a first number of flows, and wherein the second video transmission scheme includes a second, different, video chunk size, a second, different, video coding, and a second, different, number of flows;
adjusting the first target video rate based upon predicted network traffic, wherein the adjusting results in a second target video rate; and
adjusting a network resource allocation based on the adjusting of the first target video rate to facilitate a video stream to meet the second target video rate.

2. The device of claim 1, wherein the determining the first target video rate comprises applying a water-filling algorithm to a plurality of values corresponding to a respective number of bytes monitored according to the traffic pattern.

3. The device of claim 1, wherein the adjusting the first target video rate is based in part on a subscriber agreement.

4. The device of claim 1, wherein the network resource allocation is adjusted to facilitate a group of individual video streams to meet the second target video rate at each of a plurality of time slots.

5. The device of claim 1, wherein the monitoring of the network traffic includes monitoring bytes in a time series.

6. The device of claim 5, wherein the monitoring of the bytes is performed over a recurring period.

7. The device of claim 1, wherein the determining the first target video rate comprises determining an optimized video rate to provide a particular video playback quality for an over-the-top video delivery service network to individual subscribers.

8. The device of claim 1, wherein the monitoring of the network traffic comprises applying a network probe to capture network packets.

9. The device of claim 8, wherein the monitoring the network traffic comprises performing an analysis on the network packets to determine a network throughput.

10. The device of claim 1, wherein the monitoring the network traffic comprises analyzing packet headers of network packets, and wherein the packet headers are analyzed without performing a payload analysis.

11. A method comprising:
determining, by a processing system including a processor, a first target video rate based on network traffic associated with an over-the-top video delivery service network, wherein the network traffic includes a first video stream utilizing a first video transmission scheme, wherein the network traffic includes a second video stream utilizing a second, different, video transmission scheme, wherein the first video transmission scheme includes a first video chunk size, a first video coding, and a first number of flows, wherein the second video transmission scheme includes a second, different, video chunk size, a second, different, video coding, and a second, different, number of flows;
adjusting, by the processing system, the first target video rate based upon predicted network traffic, wherein the adjusting results in a second target video rate; and
modifying, by the processing system, the over-the-top video delivery service network according to the second target video rate by adjusting a network resource allocation to facilitate a video stream to meet the second target video rate.

12. The method of claim 11, wherein the determining of the first target video rate is based on applying a water-filling algorithm to a plurality of values corresponding to a respective number of monitored bytes.

13. The method of claim 11, wherein the adjusting the first target video rate is based in part on a subscriber agreement.

14. The method of claim 11, wherein the adjusting of the network resource allocation facilitates a group of individual video streams to meet the second target video rate at each of a plurality of time slots.

15. The method of claim 11, further comprising:
monitoring, by the processing system, the network traffic by applying a network probe to capture network packets; and
performing, by the processing system, an analysis on the network packets to determine a network throughput.

16. The method of claim 11, further comprising:
monitoring, by the processing system, the network traffic;
obtaining, by the processing system and based on the monitoring of the network traffic, packet headers; and
analyzing, by the processing system, the packet headers without performing a payload analysis.

17. A non-transitory machine-readable medium comprising executable instructions that, when executed by a processing system including a processor, facilitate performance of operations, the operations comprising:

determining a first target video rate from a traffic pattern, wherein the traffic pattern is determined based upon network traffic, wherein the network traffic includes a first video stream utilizing a first video transmission scheme, wherein the network traffic includes a second video stream utilizing a second, different, video transmission scheme, wherein the first video transmission scheme includes a first video chunk size, a first video coding, and a first number of flows, wherein the second video transmission scheme includes a second, different, video chunk size, a second, different, video coding, and a second, different, number of flows;

adjusting the first target video rate based upon predicted network traffic, wherein the adjusting results in a second target video rate; and adjusting a network resource allocation based on the adjusting of the first target video rate to facilitate a video stream to meet the second target video rate.

18. The non-transitory machine-readable medium of claim 17, wherein the determining the first target video rate comprises applying a water-filling algorithm.

19. The non-transitory machine-readable medium of claim 17, wherein the adjusting the first target video rate is based in part on a subscriber agreement.

20. The non-transitory machine-readable medium of claim 17, wherein the network resource allocation is adjusted to facilitate a group of individual video streams to meet the second target video rate at each of a plurality of time slots.

* * * * *